(12) United States Patent
Kreh (10) Patent No.: US 9,725,615 B2
(45) Date of Patent: *Aug. 8, 2017

(54) WATER-BASED EPOXY FORMULATIONS FOR APPLIED FIREPROOFING

(71) Applicant: United States Mineral Products Company, Stanhope, NJ (US)

(72) Inventor: Robert Paul Kreh, Middle River, MD (US)

(73) Assignee: United States Mineral Products Company, Stanhope, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 14/613,684

(22) Filed: Feb. 4, 2015

(65) Prior Publication Data

US 2015/0218412 A1 Aug. 6, 2015

Related U.S. Application Data

(60) Provisional application No. 61/935,586, filed on Feb. 4, 2014.

(51) Int. Cl.

| | | |
|---|---|---|
| *B32B 13/12* | (2006.01) | |
| *B32B 27/38* | (2006.01) | |
| *B05D 1/36* | (2006.01) | |
| *C09D 163/00* | (2006.01) | |
| *C04B 26/14* | (2006.01) | |
| *C04B 111/00* | (2006.01) | |
| *C04B 111/28* | (2006.01) | |

(52) U.S. Cl.
CPC ............ *C09D 163/00* (2013.01); *C04B 26/14* (2013.01); *C04B 2111/00482* (2013.01); *C04B 2111/28* (2013.01)

(58) Field of Classification Search
None
See application file for complete search history.

(56) References Cited

U.S. PATENT DOCUMENTS

| | | | | |
|---|---|---|---|---|
| 4,308,183 | A | 12/1981 | Williams | |
| 5,087,647 | A * | 2/1992 | Flakus | C09D 163/00 523/412 |
| 6,309,740 | B1 * | 10/2001 | Shu | C04B 14/208 252/605 |
| 2004/0176004 | A1 | 9/2004 | Fyfe | |
| 2006/0178463 | A1 * | 8/2006 | Sacks | C08K 3/36 524/444 |
| 2009/0214791 | A1 * | 8/2009 | Evanson | C04B 41/009 427/294 |
| 2015/0291809 | A1 * | 10/2015 | Kreh | C09D 5/18 428/414 |

OTHER PUBLICATIONS

2007. Concrete. Hawley's Condensed Chemical Dictionary. 325-326.*
PCT International Patent Search Report and Written Opinion dated May 7, 2015 for PCT International Patent Application No. PCT/US2015/014402.

* cited by examiner

*Primary Examiner* — Michael J Feely
(74) *Attorney, Agent, or Firm* — McCarter & English, LLP (57) ABSTRACT

The present disclosure relates to coating compositions, kits, and methods of applying the same, for use with fireproofing materials. The coating compositions are effective to control the drying rate and shrinkage of fireproofing materials. The coating compositions are also able to be applied to fireproofing materials shortly after these materials have been applied to a substrate.

17 Claims, 8 Drawing Sheets

STORAGE AND TRANSPORT
PROTECT FROM FROST/FREEZING AND STRONG RADIANT SUNLIGHT DURING TRANSPORTATION AND STORAGE
STORE AT AN EVEN TEMPERATURE BETWEEN 50° AND 100°F ( 10° AND 38°C)
KEEP CONTAINER TIGHTLY CLOSED

PRODUCT DESCRIPTION:
Isolatek International's ISOLA-GUARD WB 500 is a high-performance, two part water-based epoxy coating. ISOLA-GUARD WB 500 functions as a curing agent, water repellent and penetrating primer when applied directly over Isolatek's CAFCO® FENDOLITE® M-II, CAFCO FENDOLITE TG or CAFCO FENDOLITE M-II/P cement based fire protection system 24 hours after the fireproofing's application.

DIRECTIONS FOR USE:
*Surface Preparation:* Surface must be clean and free of any dust or loose material to ensure proper adhesion. Remove any and all traces of oil, grease, dirt, dust, biological mold or mildew and release agents.
*Mixing:* ISOLA-GUARD WB 500 is a catalyzed product supplied in 2 individual, pre-measured containers. Pre-mix Part B with a paint-style drill mixer to ensure any settled material is completely dispersed. Add all of Part A into Part B and mix thoroughly with a paint-style drill mixer for 3 minutes. Do not thin.
*Application:* Apply this product 24 hours after the application of CAFCO FENDOLITE M-II, CAFCO FENDOLITE TG or CAFCO FENDOLITE M-II/P. Use an air-assisted sprayer, brush or roller and apply product to a Dry Film Thickness (DFT) of 1.5-2.5 mils.
*Precautions:* Do not discharge into drains, watercourses, or soil. For information concerning application under very dry / low relative humidity environments, contact Isolatek International Technical Service Department.

*REFER TO ISOLA-GUARD WB 500 SHORT FORM APPLICATION GUIDE FOR ADDITIONAL INFORMATION.*

FOR PROFESSIONAL USE ONLY
KEEP OUT OF THE REACH OF CHILDREN
SHELF LIFE 10 MONTHS WHEN PROPERLY STORED

ISOLATEK INTERNATIONAL
www.isolatek.com

ISOLA-GUARD WB 500™*
(Part A)

*PATENT PENDING
Water-Based Epoxy Coating
Curing Agent
Water Repellent
Penetrating Primer

WE SAVE LIVES

Cafco Brand

ISOLATEK® Brand

Net Contents
1 US Gal. 3.8 L    MADE IN THE USA

Gross Weight
10.2 LBS 4.6KG

PRECAUTIONARY STATEMENT
Contains epoxy resin. Avoid overexposure. Ensure ventilation is adequate. Four complete air exchanges per hour until material is dry. Avoid ingestion and contact with skin, eyes and clothing. Eye protection must be worn. Wash hands after using. Keep container closed when not in use. Do not transfer contents to other containers for storage. DO NOT TAKE INTERNALLY.

EMERGENCY AND FIRST AID PROCEDURES
Skin Contact: During use, this product may cause local skin irritation. Avoid contact with skin. Wear rubber or latex type gloves. Wear typical long sleeve work clothing or a "Tyvek" type suit. Wash affected area immediately with soap and water for at least 15 minutes. Remove contaminated clothing. If irritation persists, seek medical attention.

Eyes: Wear proper eye protection; at minimum, safety glasses with side shields. Flush eyes with clean water for at least 15 minutes. If irritation persists, seek medical attention.

Inhalation: For confined areas or areas with poor ventilation, use an organic vapors cartridge type respirator. If adverse effects occur, remove to fresh air. If irritation persists, seek medical attention.

Ingestion: If swallowed drink one or two glasses of water to dilute. Do NOT induce vomiting. Consult a physician or Poison Control Center at once.

WARNING: This product contains chemicals known to the State of California to cause cancer, birth defects and other reproductive harm.

⚠ WARNING
⚠ AVISO

For Technical Inquiries Contact:
Isolatek Technical Dept. at:
(973) 347-1200

FIG. 1

STORAGE AND TRANSPORT
PROTECT FROM FROST/FREEZING AND STRONG RADIANT SUNLIGHT DURING TRANSPORTATION AND STORAGE
STORE AT AN EVEN TEMPERATURE BETWEEN 50° AND 100°F (10° AND 38°C)
KEEP CONTAINER TIGHTLY CLOSED

PRODUCT DESCRIPTION:
Isolatek International's ISOLA-GUARD WB 500 is a high-performance, two part water-based epoxy coating. ISOLA-GUARD WB 500 functions as a curing agent, water repellent and penetrating primer when applied directly over Isolatek's CAFCO® FENDOLITE® M-II, CAFCO FENDOLITE TG or CAFCO FENDOLITE M-II/P cement based fire protection system 24 hours after the fireproofing's application.

DIRECTIONS FOR USE:
*Surface Preparation:* Surface must be clean and free of any dust or loose material to ensure proper adhesion. Remove any and all traces of oil, grease, dirt, dust, biological mold or mildew and release agents.
*Mixing:* ISOLA-GUARD WB 500 is a catalyzed product supplied in 2 individual, pre-measured containers. Pre-mix Part B with a paint-style drill mixer to ensure any settled material is completely dispersed. Add all of Part A into Part B and mix thoroughly with a paint-style drill mixer for 3 minutes. Do not thin.
*Application:* Apply this product 24 hours after the application of CAFCO FENDOLITE M-II, CAFCO FENDOLITE TG or CAFCO FENDOLITE M-II/P. Use an air-assisted sprayer, brush or roller and apply product to a Dry Film Thickness (DFT) of 1.5-2.5 mils.
*Precautions:* Do not discharge into drains, watercourses, or soil. For information concerning application under very dry / low relative humidity environments, contact Isolatek International Technical Service Department.

*REFER TO ISOLA-GUARD WB 500 SHORT FORM APPLICATION GUIDE FOR ADDITIONAL INFORMATION.*

FOR PROFESSIONAL USE ONLY
KEEP OUT OF THE REACH OF CHILDREN

SHELF LIFE 10 MONTHS WHEN PROPERLY STORED

ISOLATEK INTERNATIONAL
www.isolatek.com

ISOLA-GUARD WB 500™
(Part B)

*PATENT PENDING

Water-Based Epoxy Coating
Curing Agent
Water Repellent
Penetrating Primer

WE SAVE LIVES

Cafco Brand

ISOLATEK Brand

Net Contents
3.1 US Gal. 11.7 L    MADE IN THE USA    Gross Weight
38.4 LBS 17.4 KG

PRECAUTIONARY STATEMENT
Contains polyamine curing agent. Avoid overexposure. Ensure ventilation is adequate. Four complete air exchanges per hour until material is dry. Avoid ingestion and contact with skin, eyes and clothing. Eye protection must be worn. Wash hands after using. Keep container closed when not in use. Do not transfer contents to the other containers for storage. DO NOT TAKE INTERNALLY.

EMERGENCY AND FIRST AID PROCEDURES
Skin Contact: During use, this product may cause local skin irritation. Avoid contact with skin. Wear rubber or latex type gloves. Wear typical long sleeve work clothing or a "Tyvek" type suit. Wash affected area immediately with soap and water for at least 15 minutes. Remove contaminated clothing. If irritation persists, seek medical attention.

Eyes: Wear proper eye protection; at minimum, safety glasses with side shields. Flush eyes with clean water for at least 15 minutes. If irritation persists, seek medical attention.

Inhalation: For confined areas or areas with poor ventilation, use an organic vapors cartridge type respirator. If adverse effects occur, remove to fresh air. If irritation persists, seek medical attention.

Ingestion: If swallowed drink one or two glasses of water to dilute. Do NOT induce vomiting. Consult a physician or Poison Control Center at once.

WARNING: This product contains chemicals known to the State of California to cause cancer, birth defects and other reproductive harm.

⚠ WARNING
⚠ AVISO

For Technical Inquiries Contact:
Isolatek Technical Dept. at:
(973) 347-1200

FIG. 2

| HMIS RATING | |
|---|---|
| Health Hazard | 2 |
| Fire Hazard | 1 |
| Physical Hazard | 1 |
| Personal Protection | B |

MATERIAL SAFETY DATA SHEET
(OSHA 29 CFR 1910.1200)

NFPA RATING

Effective Date: February 14, 2014
Supersedes: New

Page 1 of 2

SECTION I - PRODUCT INFORMATION

1. MANUFACTURER'S NAME AND ADDRESS:
   United States Mineral Products Company
   dba Isolatek International
   41 Furnace Street
   Stanhope, NJ 07874
2. EMERGENCY TELEPHONE NUMBER:
   973-347-1200
3. CHEMICAL NAME AND SYNONYMS:
   Epoxy Resin
4. CHEMICAL FAMILY:
   Epoxy Resin
5. FORMULA:
   N/A
6. TRADE NAMES AND SYNONYMS:
   ISOLA-GUARD WB 500™*, Part A
   * PATENT PENDING

SECTION II - HAZARDOUS INGREDIENTS/IDENTITY INFORMATION

| INGREDIENT | WT. % | CAS NUMBER | STEL | TWA (ppm) |
|---|---|---|---|---|
| Diglycidyl Ether of BisPhenol A | 80-95 | 025085-99-8 | N/E | N/E |
| Alkyl Glycidyl Ether | 5-20 | 068609-97-2 | N/E | N/E |

SECTION III - PHYSICAL/CHEMICAL CHARACTERISTICS

1. Boiling Point (°F): > 300
2. Weight % Solids: 100
3. Vapor Density (Air=1): < 1
4. VOC: < 0.18 lb./gal.
5. Specific Gravity ($H_2O$=1): 1.10-1.15
6. Melting Point (°F): N/A
7. Evaporation Rate: Slower than N-Butyl acetate.
8. Appearance and Odor: Amber liquid, mild odor.
9. Physical State: Liquid

SECTION IV - FIRE AND EXPLOSION HAZARD DATA

1. Flash Point (Method used): >350 °F (Setaflash closed cup)
2. Flammable Limits: N/A
3. Extinguishing Media: Water, $CO_2$, foam, dry chemical.
4. Special Fire Fighting Procedures: Wear positive pressure self-contained NIOSH approved breathing equipment.
5. Unusual Fire and Explosion Hazards: None

SECTION V - REACTIVITY DATA

1. Stability: Stable
2. Incompatibility (Material to Avoid): Strong oxidizing agents.
3. Hazardous Decomposition Products: CO, $CO_2$
4. Hazardous Polymerization: Will not occur by itself. Mixing masses over one pound with aliphatic amine can cause heat buildup.
5. Conditions to Avoid: Mixture with or exposure to strongly acidic or basic materials.

N/A = NOT APPLICABLE
N/E = NOT ESTABLISHED

ISOLA-GUARD WB 500, Part A

FIG. 3A

United States Mineral Products Company dba ISOLATEK INTERNATIONAL  
MSDS (ISOLA-GUARD WB 500, Part A )

Page 2 of 2  
Date 2/14/14

SECTION VI - HEALTH HAZARD DATA

Health Hazards (Acute and Chronic): Liquid contact with eyes or skin may cause irritation.

Carcinogenically:  NTP - No       IARC - No       OSHA - No

Medical Conditions Aggravated by Exposure: May cause slight temporary eye irritation. Has caused allergic skin reactions in humans. Single dose oral toxicity is low. Excessive inhalation exposure may cause irritation to upper respiratory tract.

Emergency and First Aid Procedures:
- Eye Contact: *Flush with water for 15 minutes. Seek medical attention.
- Skin Contact: *Wash affected area with soap and water. Remove contaminated clothing.
- Inhalation: *Remove to fresh air.
- Ingestion: *Drink one or two glasses of water, to dilute. Do not induce vomiting. Consult a physician or poison control center at once.

*Seek medical attention for all cases of over-exposure.

*USE NORMAL PERSONAL HYGIENE AFTER CONTACT TO REMOVE ANY MATERIAL CONTAMINANTS.*

California Proposition 65  
Warning: This product contains chemicals known to the State of California to cause cancer, birth defects and other reproductive harm.

SECTION VII - PRECAUTIONS FOR SAFE HANDLING AND USE

1. Steps to be taken in case material is released or spilled:
   Ventilate area. Spill area will be slippery. Contain spill. Recover as much as possible for reuse. Spread commercial absorbent over remainder and place into sealed containers for disposal.
2. Waste disposal method:
   Dispose in accordance with local, state, and federal regulations. Most states prohibit disposal of liquids in landfills.
3. Precautions to be taken in handling and storing:
   Avoid extreme heat and cold. Do not freeze.

SECTION VIII - CONTROL MEASURES

1. Respiratory Protection: Usually not required. However, for confined areas or areas with poor ventilation, use an organic vapors cartridge type respirator.
2. Ventilation: Mechanically exhaust vapors at point (s) of application. If applicable, maintain airborne contaminant level of chemicals below their recommended TLV's (see Section II).
3. Protective Gloves: Impervious
4. Eye Protection: Splash goggles
5. Other Protective Equipment: N/A

SECTION IX - PREPARATION INFORMATION

Prepared By: Research Department, U.S.A.  
Telephone: (973) 347-1200  
Effective Date: February 14, 2014                                     Supersedes: New The information contained herein is based on data considered accurate. However, no warranty is expressed or implied regarding the accuracy of this data or the results to be obtained from the use thereof. VENDOR SPECIFICALLY DISCLAIMS ANY WARRANTY OF MERCHANTABILITY OR FITNESS FOR A PARTICULAR PURPOSE. In no event shall the vendor be liable for special, indirect or consequential damages.

Vendor assumes no responsibility for injury to vendee or third persons proximately caused by the material if reasonable safety procedures are not adhered to as stipulated in this data sheet. Additionally, vendor assumes no responsibility for injury to vendee or third persons proximately caused by abnormal use of the material even if reasonable safety procedures are followed. Furthermore, vendee assumes all risks in his use of the material.

ISOLA-GUARD WB 500, Part A

FIG. 3B

MATERIAL SAFETY DATA SHEET
(OSHA 29 CFR 1910.1200)

HMIS RATING

NFPA RATING

Effective Date: February 14, 2014
Supersedes: New

Page 1 of 2

SECTION I - PRODUCT INFORMATION

1. MANUFACTURER'S NAME AND ADDRESS:
   United States Mineral Products Company
   dba Isolatek International
   41 Furnace Street
   Stanhope, NJ 07874
2. INFORMATION TELEPHONE NUMBER:
   973-347-1200
3. EMERGENCY TELEPHONE NUMBER:
4. CHEMICAL NAME AND SYNONYMS:
   Water-Based Epoxy Hardener
5. CHEMICAL FAMILY:
   Aqueous Polyamine Curing Agent
6. FORMULA:
   N/A
7. TRADE NAMES AND SYNONYMS:
   ISOLA-GUARD WB 500™* Part B
   * PATENT PENDING

SECTION II - HAZARDOUS INGREDIENTS/IDENTITY INFORMATION

| INGREDIENT | WT. % | CAS NUMBER | STEL | TWA (ppm) |
|---|---|---|---|---|
| Polyamine Polymer | 10-15 | Mixture | N/E | N/E |
| Tetraethylene Pentamine | <1.0% | 112-57-2 | N/E | N/E |

SECTION III - PHYSICAL/CHEMICAL CHARACTERISTICS

1. Boiling Point (°F): > 212F, 100C
2. Solids in Weight Percent: 70
3. Vapor Density (Air=1): No Data
4. VOC: < 0.16 lb./gal.
5. Specific Gravity (H₂O=1): 1.30-1.45
6. Melting Point (°F): N/A
7. Evaporation Rate: Slower than N-Butyl Acetate.
8. Appearance and Odor: Gray-tan liquid, mild ammoniacal odor
9. Physical State: Aqueous dispersion

SECTION IV - FIRE AND EXPLOSION HAZARD DATA

1. Flash Point (Method used):
   (Setaflash closed cup): No Data
2. Flammable Limits: N/A
3. Extinguishing Media: Water, $CO_2$, foam, dry chemical.
4. Special Fire Fighting Procedures: Wear positive pressure self-contained NIOSH approved breathing equipment.
5. Unusual Fire and Explosion Hazards: May generate toxic or irritating combustion products. May generate ammonia gas.

SECTION V - REACTIVITY DATA

1. Stability: Stable
2. Incompatibility (Material to Avoid): Strong oxidizing agents.
3. Hazardous Decomposition Products: CO, $CO_2$, Nox, ammonia
4. Hazardous Polymerization: Will not occur by itself. Mixing masses over one pound with epoxy compounds can cause heat buildup.
5. Conditions to Avoid: Mixture with or exposure to strongly acidic materials.

N/E = Not Established
N/A = NOT APPLICABLE

ISOLA-GUARD WB 500, Part B

FIG. 4A

United States Mineral Products Company dba ISOLATEK INTERNATIONAL
MSDS (ISOLA-GUARD WB 500, Part B)

Page 2 of 2
Date 2/14/14

SECTION VI - HEALTH HAZARD DATA

Health Hazards (Acute and Chronic): Liquid contact with eyes or skin may cause irritation.

Carcinogenicity:   NTP - No         IARC - No         OSHA - No

Medical Conditions Aggravated by Exposure.  May cause slight temporary eye irritation. Has caused allergic skin reactions in humans. Single dose oral toxicity is low. Excessive inhalation exposure may cause irritation to upper respiratory tract.

Emergency and First Aid Procedures:
- Eye Contact: *Flush with water for 15 minutes. Seek medical attention.
- Skin Contact: *Wash affected area with soap and water. Remove contaminated clothing.
- Inhalation: *Remove to fresh air.
- Ingestion: *Drink one or two glasses of water to dilute. Do not induce vomiting. Consult a physician or poison control center at once.

*USE NORMAL PERSONAL HYGIENE AFTER CONTACT TO REMOVE ANY MATERIAL CONTAMINANTS.*

California Proposition 65
Warning: This product contains chemicals known to the State of California to cause cancer, birth defects and other reproductive harm.

SECTION VII - PRECAUTIONS FOR SAFE HANDLING AND USE

1. Steps to be taken in case material is released or spilled:
   Ventilate area. Spill area will be slippery. Contain spill. Recover as much as possible for disposal. Spread commercial absorbent over remainder and place into sealed containers for disposal.
2. Waste disposal method:
   Dispose in accordance with local, state, and federal regulations. Most states prohibit disposal of liquids in landfills.
3. Precautions to be taken in handling and storing:
   Avoid extreme heat and cold. Do not freeze.

SECTION VIII - CONTROL MEASURES

1. Respiratory Protection: Usually not required. However, for confined areas or areas with poor ventilation, use an organic vapors cartridge type respirator.
2. Ventilation: Mechanically exhaust vapors at point (s) of application. If applicable, maintain airborne contaminant level of chemicals below their recommended TLV's. (See Section II)
3. Protective Gloves: Impervious
4. Eye Protection: Splash goggles
5. Other Protective Equipment: N/A

SECTION IX - PREPARATION INFORMATION

Prepared By:    Research Department, U.S.A.
Telephone:      (973) 347-1200
Effective Date: February 14, 2014                                        Supersedes: New The information contained herein is based on data considered accurate. However, no warranty is expressed or implied regarding the accuracy of this data or the results to be obtained from the use thereof. VENDOR SPECIFICALLY DISCLAIMS ANY WARRANTY OF MERCHANTABILITY OR FITNESS FOR A PARTICULAR PURPOSE. In no event shall the vendor be liable for special, indirect or consequential damages.

Vendor assumes no responsibility for injury to vendee or third persons proximately caused by the material if reasonable safety procedures are not adhered to as stipulated in this data sheet. Additionally, vendor assumes no responsibility for injury to vendee or third persons proximately caused by abnormal use of the material even if reasonable safety procedures are followed. Furthermore, vendee assumes all risks in his use of the material.

ISOLA-GUARD WB 500, Part B

FIG. 4B

*PATENT PENDING

*The applicator shall completely and fully read and understand the Long Form Application & Installation Manuals for the specific CAFCO® Spray-Applied Fire Resistive Materials (SFRMs) being used in conjunction with ISOLA-GUARD WB 500 prior to applying this product.*

Isolatek International's ISOLA-GUARD WB 500 is a high performance, two part water-based epoxy coating. ISOLA-GUARD WB 500 functions as a curing agent, water repellent and penetrating primer when applied directly over Isolatek's CAFCO® FENDOLITE® M-II, CAFCO® FENDOLITE® TG, or CAFCO® FENDOLITE® M-II/P cement-based fire protection systems.

SUBSTRATE PREP: Surface must be clean and free of any dust or loose material to ensure proper adhesion. Remove any and all traces of oil, grease, dirt, dust, biological mold or mildew or conditions likely to impair adhesion of ISOLA-GUARD WB 500.

MIXING: Product is supplied in 2 component pre-measured containers. Mix Ratio by volume is 3:1 (Part B to A) as supplied.

Part B: Pre-mix Part B with a paint-style drill mixer to ensure any settled material is completely dispersed.

Part A: Add all of Part A (clear) into Part B (gray-tan) and mix thoroughly with a paint-style drill mixer for 3 minutes.

If crystallization is present in the Part A component, heat Part A contents to 100°F (38°C) for a minimum of 30 minutes or until crystallization is no longer present. Crystallization is a partial solidification of the liquid with a gritty feel and appearance.

Do not thin. Continue to mix until a uniform color is consistent throughout the mixture.

APPLICATION EQUIPMENT: Spray: Graco 1595 or equivalent, capable of maintaining 3000psi (1.25gpm) with a 60 mesh filter in pump. Recommend 50' of 3/8" I.D. hose and a maximum of 6' of ¼" I.D. whip hose. Recommend Graco HD Texture Plus Spray Gun Model #241-705 or equivalent with the diffuser tip removed. Recommended tip size is 0.019" with the diffuser removed.

Brush: Use a soft/medium synthetic bristle brush.

Roller: Use 3/16" smooth finish nap roller.

APPLICATION THICKNESS: A minimum of 24 hours must be allowed after the application of CAFCO FENDOLITE M-II or FENDOLITE M-II/P.

Wet Film Thickness (WFT): Average 3.0 to 5.0 mils (0.08 to 0.13mm) applied in a single coat.

Note: If drips or sagging occurs, these should be spread into uncoated areas.

Dry Film Thickness (DFT): Average 1.5 to 2.5 mils (0.04 to 0.07mm).

FIG. 5A

| | |
|---|---|
| APPLICATION TEMPERATURE: | Apply product when the ambient air temperature is between 50°F (10°C) and 100°F (38°C). A minimum substrate and ambient temperature of 50°F (10°C) shall be maintained prior to, during, and a minimum of 24 hours after application.<br><br>Note: For application under very dry/low relative humidity conditions please contact Isolatek's Technical Service Department |
| CLEAN UP: | Clean up for all equipment and supplies must be done within a maximum of 10 minutes after the pot life has expired. Materials will cure or set-up in all equipment after that. Recommend adding 8 ounces of a "citrus" type industrial cleaner to a 5-gallon pail of clean water. Thoroughly flush all equipment and supplies with a minimum of two 5-gallon pails of the cleaning solution followed by minimum of two 5-gallon pails of potable water. |
| THEORETICAL COVERAGE: | 1594 ft² (147m²) per 4.1 gallon kit at 2.0 mils (0.05mm) DFT |
| SOLIDS CONTENT: | 62% (± 2% by weight) |
| POT LIFE: | 120 Minutes |
| PACKAGING, STORAGE & TRANSPORTATION: | 4.1 U.S. gallon kit (45 lbs.) consisting of Part A (9.5 lbs., 1.0 gallons) and Part B (35.5 lbs., 3.1 gallons). Product must be stored in a dry environment with temperatures between 50°F - 100°F (10°C - 38°C). Protect against strong radiant sunlight during transportation and storage.<br><br>MATERIAL MUST BE KEPT FROM FREEZING |
| SHELF-LIFE: | 10 months in unopened sealed containers with adherence to storage and transportation requirements. |
| PRECAUTIONS: | Do not discharge into drains, watercourses or soil. |
| HEALTH & SAFETY: | Refer to Material Safety Data Sheet (MSDS) for complete information. |

For additional information, please contact the Technical Service Department at (800) 631-9600 (Option 1).

41 Furnace Street, Stanhope, NJ 07874  Tel: (800) 631-9600  Fax: (973) 347-6730
Visit us at www.isolatek.com or contact us at technical@isolatek.com

WE SAVE LIVES®

FIG. 5B

WATER-BASED EPOXY FORMULATIONS FOR APPLIED FIREPROOFING

CROSS REFERENCE TO RELATED APPLICATIONS

The present application claims priority benefit to a U.S. provisional patent application filed on Feb. 4, 2014, and assigned Ser. No. 61/935,586. The entire content of the foregoing provisional patent application is incorporated herein by reference.

FIELD OF THE TECHNOLOGY

The present disclosure relates to coating compositions, kits and methods of applying the same, for use with fireproofing materials.

BACKGROUND

In the construction industry, structures can be coated with passive fireproofing material. Fireproofing material is known to provide fire resistance to steel elements of buildings. Fireproofing material is used to produce coatings over a substrate to be protected. The coatings can be held together by organic or inorganic binders. Those with inorganic binders are the primary subject of this disclosure and will be referred to as "inorganic fireproofing", "spray-applied fireproofing material" or "SFRM". Other fireproofing wherein the primary binders are organic chemicals are often referred to as "intumescing fire-resistive materials" or "IFRM".

SFRMs usually consist of inorganic binders such as plaster or Portland cement, and various fillers such as vermiculite, mica, calcium silicate, gypsum, lightweight polystyrene beads, mineral wool, glass fibers, ceramic fibers, aluminum ore, clay and quartz. Examples of plaster-based fireproofing products are Cafco® 300 from Isolatek International, Pyrolite® 15 from Carboline and Monokote® MK-6 from W. R. Grace. Examples of Portland-cement-based fireproofing products are Fendolite® MII from Isolatek International, Pyrocrete® 241 from Carboline and Monokote® Type Z-146 from W. R. Grace.

Passive fireproofing materials, once applied, are often coated. The coatings can provide additional durability, particularly against negative effects caused by corrosive chemicals or the ingress of water from rain, washing and salt water. Physical degradation from freeze-thaw cycles is an example of such a negative effect. It is common in the industry to use a non-aqueous (i.e., organic based) sealant as the coating. These organic based coatings can act as a sealant and/or a top-primer for subsequent application of other protective or decorative coatings, such as paint. An example of an organic based sealant is Carboguard® 1340.

It is beneficial to apply the coating soon after the fireproofing material has been applied to a substrate. Application of the coating within a few hours or a few days can reduce the cost of scaffolding or other construction support. Once the fireproofing material has been coated, these construction supports can be removed. The ability for construction to progress without the delay of waiting for the coating to be applied can reduce rental costs and free the area for other uses. Prompt coating can also reduce the rate of early drying. It can also allow for good curing and strength development, particularly in hot and/or dry conditions.

In most applications, it is beneficial for the coating to uniformly coat the fireproofing material. Applied fireproofing can be thick (e.g., 1-2 inches or more) and can initially contain substantial water (e.g., 30-70%). Depending on environmental conditions, applied fireproofing can require a number of days for curing. Coatings, such as Carboguard® 1340, do not provide a sufficiently uniform coating when applied soon after the fireproofing material has been applied. Due to the high water content, the non-aqueous and hydrophilic liquid tends to pool or bead up when applied which results in a spotty, non-uniform coating. Accordingly, this non-uniform coating can then fail to provide the desired enhancement of durability and/or reduction of early drying rates.

The present disclosure relates to coating compositions, kits, and methods of applying the same, for use with fireproofing materials. The coating compositions are effective to control the drying rate and shrinkage of fireproofing materials. They are also able to be applied to fireproofing materials shortly after these materials have been applied to a substrate.

SUMMARY

The present disclosure relates to coating compositions, kits, and methods of applying the same, for use with fireproofing materials.

In one embodiment, the present disclosure relates to a method of coating a fireproofing material including applying a coating composition to the fireproofing material, wherein the fireproofing material has a water content of at least about 20 wt %, and wherein the coating composition forms a uniform coating on the fireproofing material.

In another embodiment, the present disclosure relates to a method of coating a fireproofing material including applying a coating composition to the fireproofing material within one (1) hour after the fireproofing material is applied to a substrate, wherein the coating composition forms a uniform coating on the fireproofing material.

In another embodiment, the present disclosure relates to a water-based epoxy coating composition comprising an epoxy resin, an amine hardener, and water.

In another embodiment, the present disclosure relates to a composition comprising a first layer including fireproofing material, and a second layer including a water-based epoxy coating composition. The fireproofing material in the composition can have a water content of at least about 20 wt %. The water-based epoxy coating in the composition can form a uniform coating on the fireproofing material.

In another embodiment, the present disclosure relates to a kit for preparing a coating composition comprising a first solution having an epoxy resin, and a second solution having an amine hardener, wherein one or both of the solutions contain water.

BRIEF DESCRIPTION OF THE EXHIBITS

FIGS. 3A, 3B, 4A and 4B are material safety data sheets for commercial embodiments of the present disclosure.

DETAILED DESCRIPTION

The present disclosure relates to coating compositions, kits, and methods of applying the same, for use with fireproofing materials. One object of the present disclosure is to reduce the rate of drying and shrinkage in spray-applied fireproofing, in particular fireproofing containing lightweight aggregate and binders (e.g., plaster or cement). By slowing the drying rate, the strength of the fireproofing material can be increased. Similarly, by slowing the shrinkage rate, the potential for cracking can be reduced.

Surprisingly, it has been found that water-based epoxy coatings can be applied very soon after the wet fireproofing has been applied. It was anticipated that a water-based epoxy formulation might fail to provide an effective coating on substantially-wet fireproofing due to dilution by the water in the fireproofing, thus impairing the amine/epoxy reaction necessary to form a coating. It was also anticipated that the hydrophilic nature of a water-based epoxy coating might provide too much water-permeation and fail to provide the desired retardation of drying and protection against water ingress. The coating compositions (e.g., water-based epoxy formulations) of the present disclosure form uniform and effective coatings which are not substantially affected by water permeation.

Water based sealants, such as Carboguard® 1340 WB, are known. As described in the Carboguard® 1340 WB product data sheet, however, Carboguard® 1340 WB is indicated for use only with concrete. It is not described as useful or applicable to fireproofing. In addition, Carboguard® 1340 WB is indicated for use only after 28 days after new concrete has been poured and cured. It is not described as useful or applicable to wet and/or uncured concrete or fireproofing.

As used herein, the term "drying rate" or "drying time" refers to the time it takes for an applied fireproofing to dry from its original or applied water content (e.g., 50 wt % water) to its nominal or resting water content (e.g., 5 wt % water).

As used herein, the term "shrinkage" or "shrinkage rate" refers to the rate of decrease in the length of material in one or more directions during drying/curing, thereby causing a reduction in the rate of volume decrease.

In one embodiment, the present disclosure relates to a method of coating a fireproofing material including applying a coating composition to the fireproofing material, wherein the fireproofing material has a water content of at least about 20 wt %, and wherein the coating composition forms a uniform coating, or substantially uniform coating over a portion or substantial portion, on the fireproof material. Uniformity is usually determined by visual inspection, wherein a non-uniform coating is characterized by visual differences in color or gloss.

The fireproofing material can be known fireproofing material used in construction. The material can include one or more inorganic binders, such as plaster and Portland cement. The material can also include one or more fillers, such as vermiculite, mica, calcium silicate, gypsum, lightweight polystyrene beads, mineral wool, glass fibers, ceramic fibers, aluminum ore, clay and quartz. The fireproofing material can include plaster-based fireproofing products, such as Cafco® 300, Pyrolite® 15 and Monokote® MK-6, and Portland-cement-based fireproofing products, such as Fendolite® MII, Pyrocrete® 241 and Monokote® Type Z-146.

The coating composition can be applied by known methods used for the application of sealants and topcoats to fireproofing materials. Common methods of application include by spray, roller or brush. In particular, the coating composition is sprayed onto the fireproofing material.

The coating composition can be epoxy based. The coating can contain an epoxy resin and an hardener. The epoxy resin can be selected from known epoxy resins. The epoxy resin can be a polyepoxide compound containing at least two epoxy groups. It can be saturated or unsaturated, aliphatic, cyclo aliphatic, aromatic or heterocyclic and can be substituted. The epoxy resin can be monomeric or polymeric.

In one embodiment, the epoxy resin can be a diepoxide. Diepoxide as used herein refers to an epoxide compound or mixture of epoxide compounds wherein at least one of the compounds contains two epoxy groups. The epoxy resin can be a liquid at a temperature in a range from 10° C. to less than 50° C. Examples of aliphatic forms of the epoxy resin include trimethylpropane epoxide, and diglycidyl-1,2-cyclohexane dicarboxylate.

Other examples of the epoxy resin can include, for example, the glycidyl ethers of polyhydric phenols or epoxy resins prepared from an epihalohydrin and a phenol or a phenol type compound. The phenol type compound includes compounds having an average of more than one aromatic hydroxyl group per molecule. Examples of phenol type compounds include dihydroxy phenols, biphenols, bisphenols, halogenated biphenols, halogenated bisphenols, hydrogenated bisphenols, alkylated bisphenols, trisphenols, phenol-aldehyde resins, novolac resins (i.e., the reaction product of phenols and simple aldehydes, preferably formaldehyde), halogenated phenol-aldehyde novolac resins, substituted phenol-aldehyde novolac resins, phenol-hydrocarbon resins, substituted phenol-hydrocarbon resins, phenol-hydroxybenzaldehyde resins, alkylated phenol-hydroxybenzaldehyde resins, hydrocarbon-phenol resins, hydrocarbon-halogenated phenol resins, hydrocarbon-alkylated phenol resins, or combinations thereof.

Additional examples of the epoxy resin can include the diglycidyl ethers of resorcinol, catechol, hydroquinone, bisphenol, bisphenol A, bisphenol AP (1,1-bis(4-hydroxy 1-phenyl)-1-phenyl ethane), bisphenol F, bisphenol, bisphenol S, tetrabromobisphenol A, phenol-formaldehyde novolac resins, alkyl substituted phenol-formaldehyde resins, phenol-hydroxybenzaldehyde resins, cresol-hydroxybenzaldehyde resins, dicyclopentadiene-phenol resins, dicyclopentadiene-substituted phenol resins, tetramethylbiphenol, tetramethyl-tetrabromobiphenol, tetramethyltribromobiphenol, tetrachlorobisphenol A, or a combination thereof. In one embodiment, the epoxy resin is a bisphenol A diglycidyl ether.

Examples of bisphenol A based epoxy resins can include commercially available epoxy resins such as D.E.R.™ 300 series (e.g., D.E.R.™ 383) and D.E.R.™ 600 series, commercially available from The Dow Chemical Company. Examples of epoxy novolac resins can include commercially available resins such as D.E.N.™ 400 series, commercially available from The Dow Chemical Company.

The hardener can be selected from known hardeners. Examples of hardeners, or curative compounds, include formaldehyde hardeners and amine hardeners. Formaldehyde hardeners include phenol-formaldehyde, resorcinol-formaldehyde, catechol-formaldehyde, hydroquinone-formaldehyde, cresol-formaldehyde, phloroglucinol-formaldehyde, pyrogallol-formaldehyde, melamine-formaldehyde, urea-formaldehyde, and blends or derivatives thereof. Polyamine hardeners include aliphatic or alicyclic polyamines, such as ethylenediamine (EDA), diethylenetriamine (DETA), triethylenetetramine (TETA), tetraethylenepentamine (TEPA), polyoxypropylenediamine, polyoxypropylenetriamine, isophorone diamine, menthane diamine, bis (4-amino-3-methyldicyclohexyl)methane and blends or derivatives thereof.

The hardener can also contain one or more linear or branched polyalkylene polyamines. The polyalkylene polyamine can have three or more amine hydrogens per molecule, up to as many as 10 or more. The alkylene groups each can contain from 2 to 8 carbons, preferably from 2 to 6 carbons, and can be linear or branched. The polyalkylene polyamines can have amine hydrogen equivalent weights as low as about 20 to as much as 50. The molecular weight of the polyalkylene polyamine can be up to 500, preferably up to 200. The polyalkylene polyamine can contain one or more tertiary amino groups. These polyalkylene amines can include, for example, diethylene triamine, triethylene diamine, tetraethylenepentamine, higher polyethylene polyamines, N',N'-bis(2-aminoethyl)ethane-1,2-diamine, 2-methylpentane-1,5-diamine and blends or derivatives thereof.

Additional examples of hardeners include diaminocyclohexane, aminoethylpiperazine, dicyandiamide, phenylene diamine (particularly the meta-isomer), methylene dianiline, bis(4-amino-3,5-dimethylphenyl)-1,4-diisopropylbenzene, bis(4-amino-phenyl)1,4-diiospropylbenzene, mixtures of methylene dianiline and polymethylene polyaniline compounds (sometimes referred to as PMDA, including commercially available products such as DL-50 from Air Products and Chemicals, Inc.), diethyltoluenediisocyanate, methylene bis(cyclohexylamine), 1,2-, 1,3- and/or 1,4-bis(aminomethyl)cyclohexane, 2- and/or 4-alkylcyclohexane-1,3-diamine, diaminodiphenylsulfone and amine-epoxy resin adducts such as are commercially available as D.E.H.™ 52 from The Dow Chemical Company.

The hardener can also contain an amido-amine, such as those where some or all of the amine nitrogen atoms are instead amides. These can be the equivalent to that obtained through the reaction of a "fatty acid" with one or more amine nitrogen atoms. These fatty acids can contain 8-24 carbon atoms and can contain one or more carboxyl group. The amines can be derived from aliphatic polyamines such as ethylenediamine. diethylenetriamine, triethylenetetramine, tetraethylenepentamine and the like. Commercially-available examples are Anquamine 401 and Anquamine 701, sold by Air Products and Chemicals, Inc.

In some embodiments, zinc lower alkyl dithiocarbamate accelerators can be used as the primary accelerator. These materials are commercially available in association with zinc in salt form, namely zinc dibutyl dithiocarbamate, zinc diethyl dithiocarbamate, zinc dimethyl dithiocarbamate and zinc diamyl dithiocarbamate. In the absence of a primary accelerator, higher levels of secondary accelerators can be used.

Water can also be present in the epoxy and/or hardener part of the composition. The epoxy and/or hardener parts can include surfactants or appropriate chemical modifications to provide water compatibility.

In another embodiment, the present disclosure relates to a water-based epoxy coating composition comprising an epoxy resin, such as an bisphenol A based epoxy resin, and a hardener, such as an aliphatic polyamine component, and water. In a further embodiment, the present disclosure relates to a composition comprising a first layer including fireproofing material, and a second layer including a water-based epoxy coating composition.

The ratio of epoxy resin to hardener in the coating composition can vary depending on the characteristics of the epoxy desired. The ratio of epoxy resin to hardener in the coating composition can range from 1:99 to 99:1. In particular, the ratio of epoxy resin to hardener in the coating composition can range from 1:10 to 10:1, or more particularly from 1:5 to 5:1.

The amount of epoxy resin and hardener in the coating composition can also vary depending on the desired characteristics. In some embodiments, the amount of epoxy resin in the coating composition can be at least about 5%, 10%, 15%, 20%, 25%, 30%, 35%, 40%, 45%, 50%, 55%, 60%, 65% or about 70% by weight. These values can also define a range, such as about 5 wt % to about 70 wt %, and in particular from about 10 wt % to about 60 wt %. In other embodiments, the amount of hardener in the coating composition can be at least about 5%, 10%, 15%, 20%, 25%, 30%, 35%, 40%, 45%, 50%, 55%, 60%, 65% or about 70% by weight. These values can also define a range, such as about 5 wt % to about 70 wt %, and in particular from about 15 wt % to about 55 wt %.

The coating composition can be aqueous or semi-aqueous based. In one embodiment, the composition can have a water content of at least about 5%, 10%, 15%, 20%, 25%, 30%, 35%, 40%, 45%, 50%, 55%, 60%, 65%, 70%, 75%, 80%, 85% or about 90% by weight. These values can also define a range, such as about 10 wt % and about 90 wt %. In particular, the water content can be between about 10 wt % and about 80 wt %, or about 30 wt % and about 70 wt %. In one embodiment, the present disclosure relates to a water-based epoxy composition for coating over cement-based or plaster-based fireproofing, wherein the water content of the water-based epoxy composition is between about 10 wt % and about 90 wt %.

Additional components can also be contained in the coating composition. These additional components can include inorganic fillers, titanium oxide, clay, zinc oxide, barium sulfate, limestone, dolomite, talc, carbon black, silica, mica, wollastinite, quartz, microsperes, and combinations thereof. In some embodiments, the additional components are non-polar, or substantially non-polar. In these embodiments, other polar groups, such as oxygen, are avoided. In other embodiments, the present disclosure relates to a water-based composition wherein the reactive components contain no oxygen atoms, other those provided by the epoxy functionality. As provided by the epoxy functionality, the oxygen-containing components are in the form of either ether, hydroxyl or epoxide oxygens. In some embodiments, the composition can contain components with oxygen atoms in addition to those provided by the epoxy functionality. These additional components can be in the form of ether, hydroxyl or epoxide oxygens.

In one embodiment, the present disclosure relates to a water-based composition containing at least 10 wt % inorganic fillers. In another embodiment, the present disclosure relates to a water-based composition containing at least 5 wt % titanium dioxide. In another embodiment, the present disclosure relates to a water-based composition containing at least 5 wt % clay. The present disclosure can contain other components including defoamers, thickeners, wetting agents, surfactants, anti-settling agents, pigments, dyes, corrosion inhibitors, accelerants such as zinc oxide, acids, phosphites or tertiary amines, solvents such as ethylene glycol, butyl ether, coalescents such as Texanol™ by Eastman or Solusolv™ 2075 by Solutia and additional resins such as vinyl and acrylic polymers.

The coating composition of the present disclosure can also contain dyes or pigments. The presence of dyes and pigments can assist in the application of a uniform coating. While the coating composition is applied, the color of the coating composition can be observed to ensure an appropriate and uniform coating is applied. The color of an appropriate coating can vary based, in part, on the concentration of dye used and the thickness of the desired coating. A particular embodiment is a color, which when dry, matches the un-coated color of the fireproofing, such that any minor future damage does not present an objectionable appearance.

The coating composition can be applied onto an applied fireproofing material having a high water content. The coating composition can provide an effective coating when applied to a damp and/or wet fireproofing surface. The coating composition is not impaired by any dilution that may occur by the water in the surface layers of the fireproofing material. The coating composition can be applied to an applied fireproofing material having at least about 10%, 15%, 20%, 25%, 30%, 35%, 40%, 45%, 50%, 55%, 60%, 65%, 70% or about 75% of water by weight. These values can also be used to define a range. While the coatings are water based, once cured, they provide sufficient resistance to water permeation and the necessary retardation to allow sufficient drying and concomitant reduction in the rate of shrinkage.

Where applied, the coating composition can form a uniform coating on the fireproofing material. A uniform coating can include the following; no coating-free portions of the material, each portion of the coating having substantially the same thickness, all of the components of the coating composition evenly dispersed in the coating, and/or the coating performs (e.g., protects, supports, reduces) substantially the same across the coated fireproofing material.

In another embodiment, the present disclosure relates to a method of coating a fireproofing material including applying a coating composition to the fireproofing material within 1 hour after the fireproofing material is applied to a substrate, wherein the coating composition forms a uniform coating on the fireproofing material. Typically, a long or extended amount of time must be passed before a coating can be applied to fireproofing. The need for an extended time is, in part, because the applied fireproofing has a high water content (e.g., damp surface) and non-aqueous coating compositions are incompatible with damp surfaces. The application of such a non-aqueous coating composition to a damp fireproofing surface results in non-uniform coating.

Typically, the water content of an applied fireproofing material is highest directly after application to a substrate. The coating composition can also be applied to an applied fireproofing at an early stage of dryness, such as within about 1 hour after the fireproof material is applied to the substrate. Because the coating composition is aqueous or semi-aqueous based, the coating composition forms a uniform coating on the applied fireproofing. In particular, the coating composition can be applied to an applied fireproofing within about 192 hours, or about 168 hours, or about 120 hours, or about 96 hours, or about 80 hours, or about 72 hours, or about 50 hours, or about 48 hours, or about 40 hours, or about 36 hours, or about 24 hours, or about 16 hours, or about 12 hours, or about 8 hours, or about 6 hours, or about 4 hours, or about 2 hours, or about 1 hour after the fireproof material is applied to the substrate. The coating composition can be applied within a time window based on any of these times, such as for example, between about 1 hour and about 80 hours, or any combination as provided. In one embodiment, the present disclosure relates to a water-based composition wherein the coating is applied within 8 days from the time that the fireproofing was applied.

The thickness of the coating should be sufficient to provide adequate drying and protection from water ingress, as well as other properties described herein. The thickness of the coating can be measured by calculation, based on the wet volume sprayed and the percent solids by volume. The thickness can be between about 0.2, 0.3, 0.4, 0.5, 0.6, 0.7, 0.75, 0.8, 0.9, 1, 1.5, 2, 3, 4, 5, 6, 7, 8, 9 or about 10 mils. These values can also define a range, such as about 0.5 and about 8 mils, or about 0.75 and about 6 mils, or about 1 and about 6 mils, or any combination thereof. (1 mil=25 micrometers). In one embodiment, the present disclosure relates to a water-based coating composition generated by the water-based epoxy composition that have a thickness of about 0.5 to about 8 mils.

To be applied properly to the fireproofing material, the coating composition should have an appropriate viscosity. In one embodiment, the composition can have a viscosity between about 500 and about 2,000 centipoises as measured on an RVT Brookfield at 23° C., 10 rpm, and spindle 3.

By applying the coating composition of the present disclosure to applied fireproofing, the drying rate and/or the shrinkage rate of applied fireproofing can be controlled (e.g., reduced). An acceptable drying rate is one in which the rate over the first seven days has been reduced, relative to uncoated material, by 10-50% or more particularly by 20-40%. In situations where the drying rate of the applied fireproofing is too fast, the fireproofing material can have reduced strength, effectiveness, longevity, cracking or combinations thereof. Increased drying rates can occur due to dry weather conditions, excessive temperature, sun exposure, high air movement or combinations thereof.

The coating composition of the present disclosure can reduce the drying rate of an applied fireproofing by at least about 10% as compared to the drying rate of an applied fireproofing without the coating composition. In particular, the drying rate can be reduced by at least about 20%, or at least about 30%, or at least about 40%, or at least about 50%, or at least about 60%, or at least about 70%, or at least about 80%, or at least about 90% as compared to the drying rate of an applied fireproofing without the coating composition.

The drying rate can be measured on a weekly basis. In one embodiment, the coating composition can provide a coating that reduces the rate of drying over the first week by at least about 5%, or by at least about 10%, or by at least about 15%, or by at least about 20%, or by at least about 30%, or by at least about 40%, or by at least about 50%, or by any ranges of these values (e.g., 10-50% or 20-40%).

An acceptable shrinkage rate is one in which the rate during the first week of drying is less than 80% of the rate without the coating, or more particularly less than 60% of the rate without the coating. In situations where the shrinkage rate of the applied fireproofing is too fast, the fireproofing material can form cracks and can have reduced strength, effectiveness, longevity or combinations thereof. Increased shrinkage rates can occur due to dry weather conditions, excessive temperature, wind, sun exposure or combinations thereof.

The coating composition of the present disclosure can reduce the shrinkage rate of an applied fireproofing by at least about 10% as compared to the shrinkage rate of an applied fireproofing without the coating composition. In particular, the shrinkage rate can be reduced by at least about 20%, or at least about 30%, or at least about 40%, or at least about 50%, or at least about 60%, or at least about 70%, or at least about 80%, or at least about 90% as compared to the shrinkage rate of an applied fireproofing without the coating composition.

In addition to drying rates and shrinking rates, the coating composition of the present disclosure can prevent or reduce water ingress through the coating. For example, the coating composition can reduce the water penetration into the fireproofing material by at least about 5%, or by at least about 10%, or by at least about 15%, or by at least about 20%, or by at least about 30%, or by at least about 40%, or by at least about 50%, or by any ranges of these values, as compared to untreated fireproofing.

In some embodiments, a further latex coating can be applied over the coating composition on the fireproofing material. The latex coating can contain polymers or copolymers based on esters of acrylic acid or vinyl alcohol. In one embodiment, the latex coating can be applied to the coated, applied fireproofing within 1 days of the application of the coating composition. In particular, the latex coating can be applied to the coated, applied fireproofing within 2 days, or about 4 days, or about 7 days, or about 10 days, or about 14 days, or about 21 days, or about 28 days, or about 30 days of the application of the coating composition.

In another embodiment, the present disclosure relates to a kit for preparing a coating composition comprising a first solution having an epoxy resin, such as a bisphenol A based epoxy resin, and a second aqueous solution having a hardener, such as an aliphatic polyamine.

The disclosures of all cited references including publications, patents, and patent applications are expressly incorporated herein by reference in their entirety.

When an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

The present invention is further defined in the following Examples. It should be understood that these Examples, while indicating preferred embodiments of the invention, are given by way of illustration only.

EXAMPLES

Example 1—Fireproofing Material

A fireproofing material was applied to a series of steel plates. A 50 bag of Fendolite® MII (Isolatek International) was mixed with 40 pounds of potable water using a paddle mixer. This mixture was then sprayed onto 12"×12" steel plates to a wet thickness of 1.5 inches. These plates having an applied fireproofing material were used to test different coating compositions.

Example 2—Non-Polar Water-Based Epoxy Sealant

A non-polar water-based epoxy sealant was prepared.
PART A: In a steel cup, the following components were mixed:

| Component | Amount | Wt % | Supplier/Description |
|---|---|---|---|
| Epon 828 | 34.72 g | 15.1% | Momentive/Epoxy resin |
| WD-510 | 103.23 g | 44.9% | Momentive/Water-based epoxy resin |
| GE-8 | 92.1 g | 40.0% | Emerald/C12-C14 Glycidyl Ether Aliphatic Monofunctional Epoxy/Reactive Diluent to decrease viscosity |
| | 230.05 g | 100% | |

PART B: In a steel cup, the following components were mixed:

| Component | Amount | Wt % | Supplier/Description |
|---|---|---|---|
| Water | 260 g | 34.46% | Carrier |
| Kelzan AR | 0.7 g | 0.09% | CPKelco/Thickener |
| Anquamine 401 | 155.6 g | 20.62% | Air Products and Chemicals, Inc./Hardener |
| BYK-034 | 2.86 g | 0.34% | BYK USA, Inc./Defoamer |
| Carbowet 109 | 7.21 g | 0.96% | Air Products and Chemicals, Inc./Surfactant |
| Kronos 2300 | 104.2 g | 13.81% | Kronos/White Pigment |
| Zinc Oxide | 36.34 g | 4.82% | U.S. Zinc/Reaction rate modifier |
| Cimbar 325 | 182 g | 24.12% | Cimbar/Barium Sulfate Filler |
| Aurosperse W-1025 | 5 g | 0.66% | BASF/Yellow Pigment |
| Formblak Jet N32 | 0.67 g | 0.09% | Color Mate, Inc./Black Pigment |
| | 754.58 g | 100% | |

Parts A and B were mixed together and used to coat the fireproofing material from Example 1. The mixture was applied by brush to yield a uniform coating appearance with a calculated dry film thickness of 2 or 4 mils.

Figure 1:
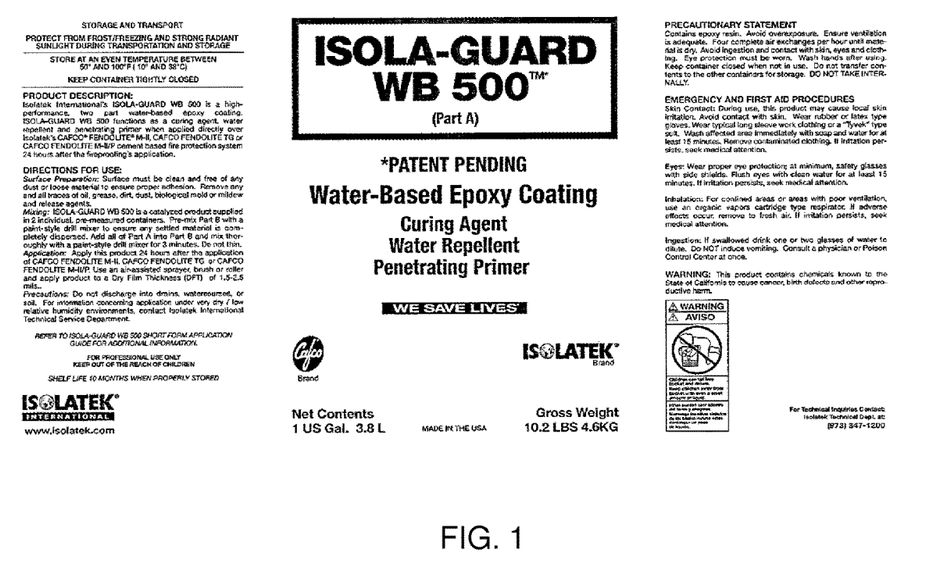
FIGS. 1 and 2 are labels for commercial embodiments of the present disclosure.
Figure 2:
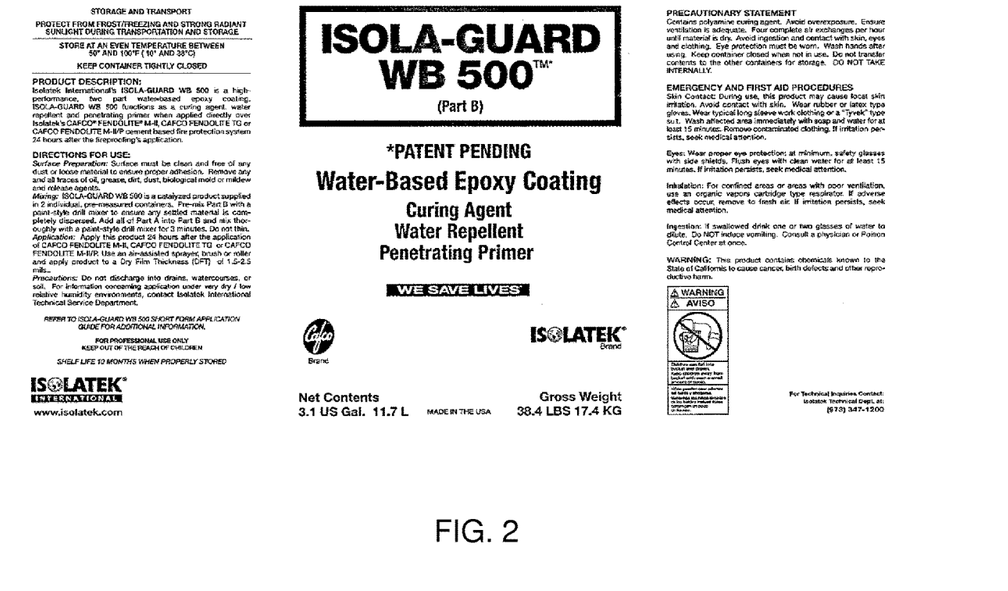
Figure 3A:
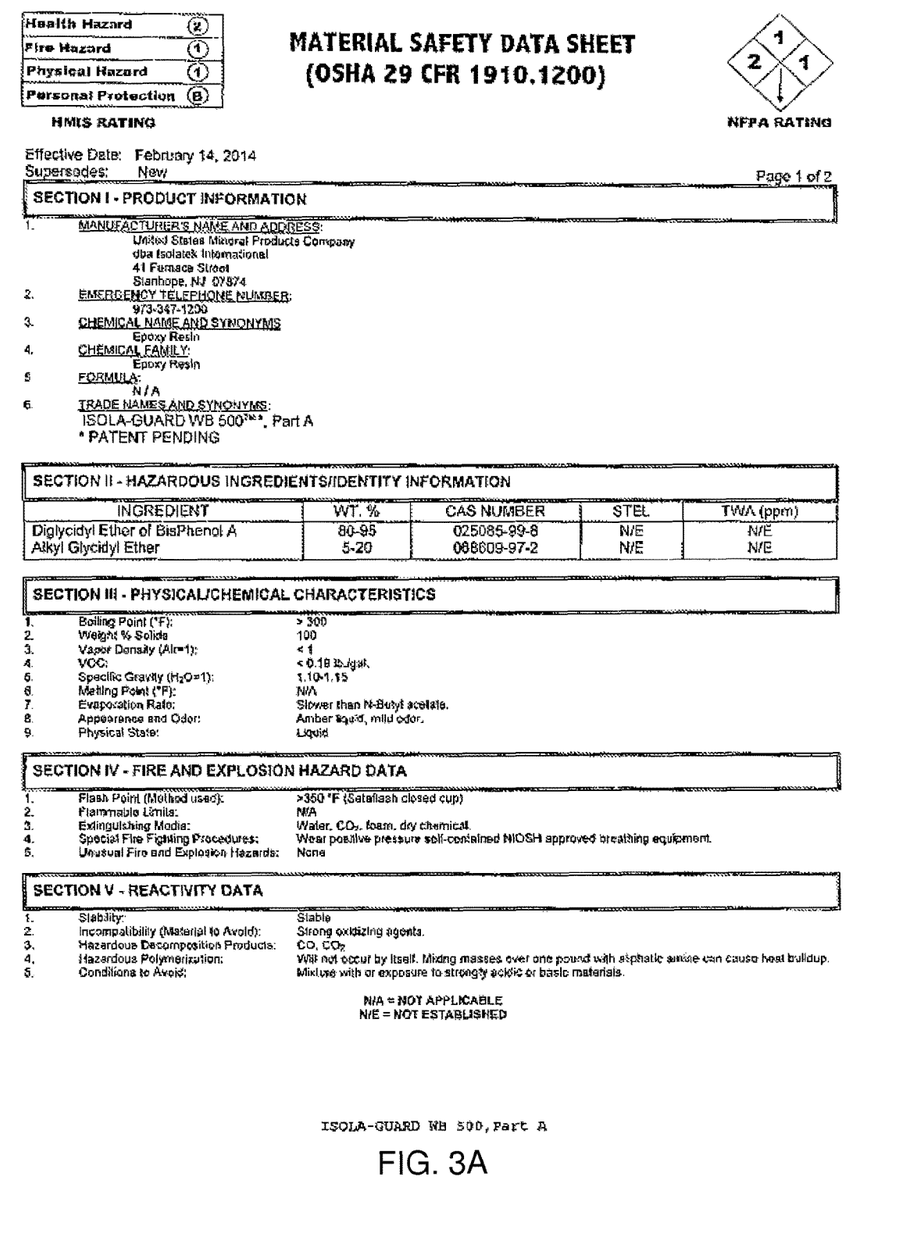
Figure 4A:
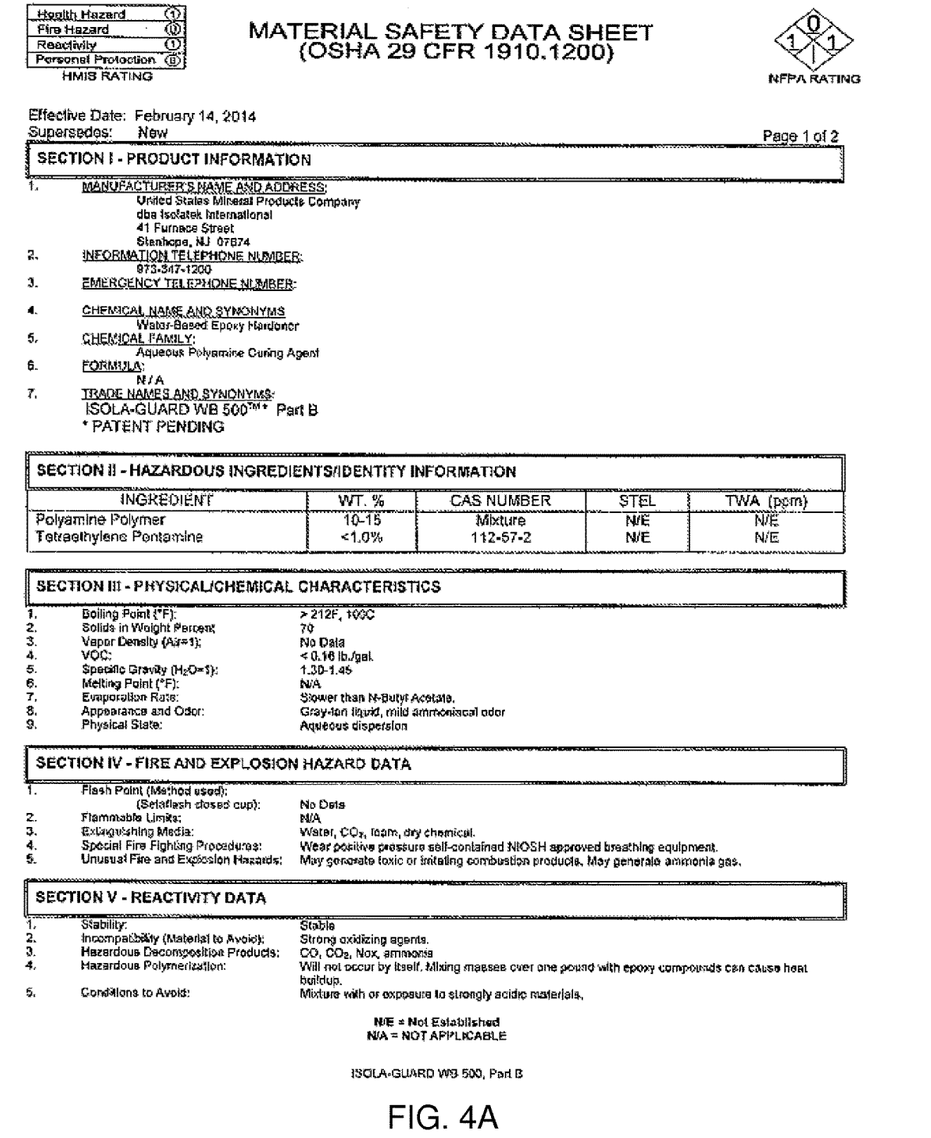
Figure 5A:
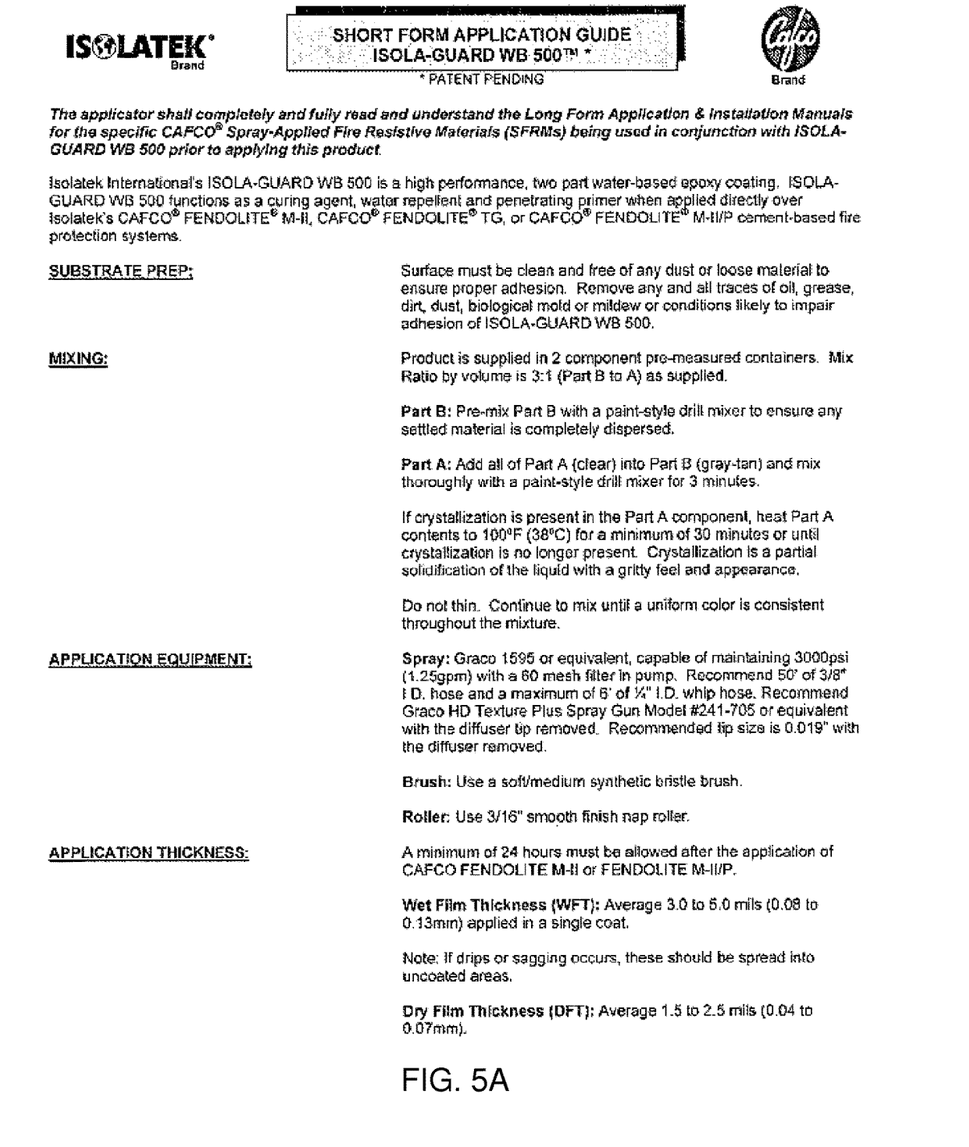
FIGS. 5A and 5B are an application guide for commercial embodiments of the present disclosure.
Figure 5B:
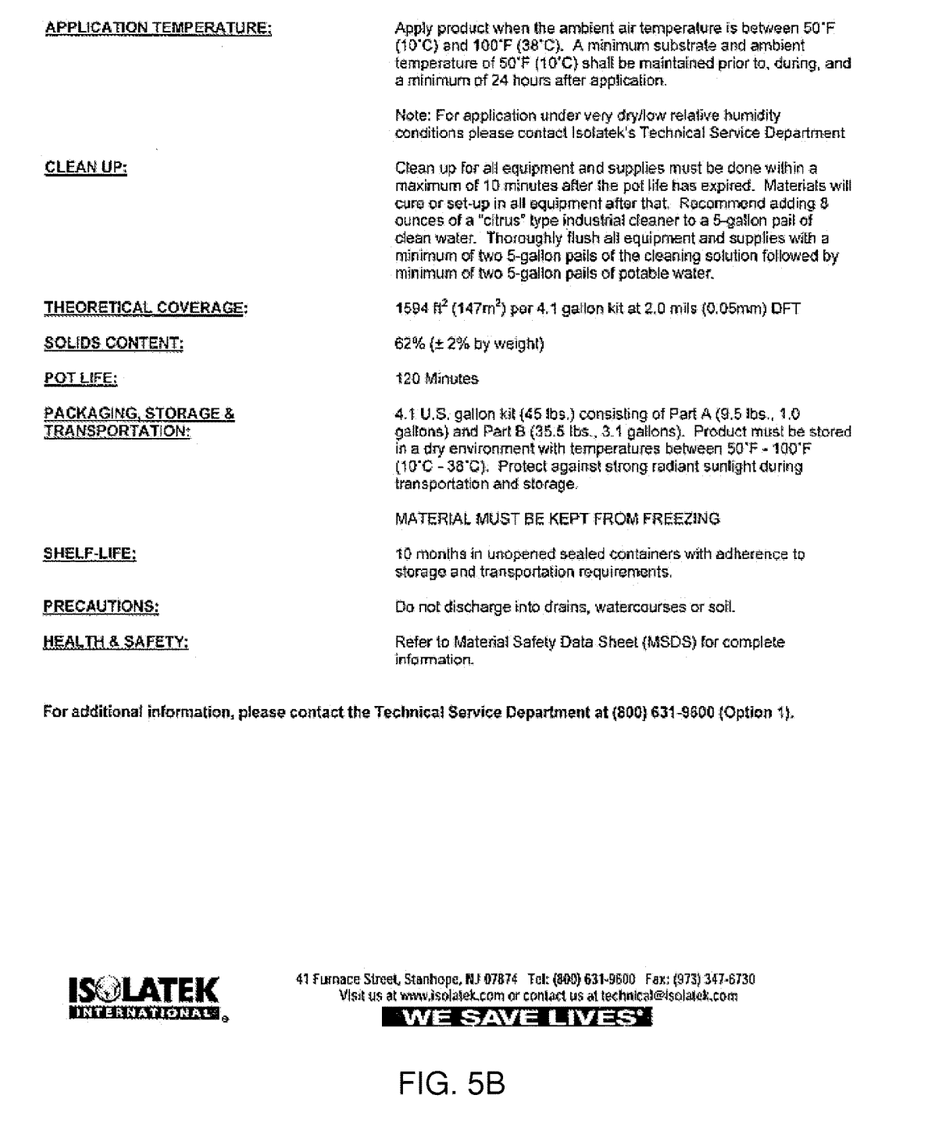

FIGS. 1 and 2 are labels for commercial embodiments of the present disclosure. FIG. 1 describes the epoxy part. FIG. 2 describes the hardener part. FIGS. 3A, 3B, 4A and 4B are material safety data sheets for commercial embodiments of the present disclosure. FIGS. 3A and 3B are the MSDS for the epoxy part. FIGS. 4A and 4B are the MSDS for the hardener part. FIGS. 5A and 5B are an application guide for commercial embodiments of the present disclosure.

Example 3—Non-Water-Based, Non-Polar Sealant: Carboguard® 1340

A commercial non-water-based epoxy sealant, Carboguard® 1340, was used to coat the fireproofing material from Example 1. The sealant was applied by brush to a dry film thickness of 2-4 mils. Coatings applied at 24 hours were "spotty" due to pooling of the non-water-based material on the wet/damp surface.

Example 4—Polar Water-Based Epoxy Sealant

A polar water-based epoxy sealant was prepared.
PART A: In a steel cup, the following components were mixed:

| Component | Amount | Wt % | Supplier/Description |
|---|---|---|---|
| Epon 828 | 24 g | 13.91% | Momentive/Epoxy resin |
| WD-510 | 42.5 g | 24.64% | Momentive/Water-based epoxy resin |
| DER-732 | 28.5 g | 16.52% | Dow Chemical/Polar epoxy resin |
| Carbowet 109 | 2.5 g | 1.45% | Air Products and Chemicals, Inc./Surfactant |
| Kronos 2300 | 75.0 g | 43.48% | Kronos, Inc./White Pigment |
| | 172.5 g | 100% | |

PART B: In a steel cup, the following components were mixed:

| Component | Amount | Wt % | Supplier/Description |
|---|---|---|---|
| Water | 186 g | 49.53% | Carrier |
| Kelzan AR | 1.24 g | 0.33% | CPKelco/Thickener |
| Anquamine 401 | 55.8 g | 14.86% | Air Products and Chemicals, Inc./Hardener |
| Dysperbyk 190 | 3.1 g | 0.83% | BYK USA, Inc./Dispersant |
| BYK-034 | 1.24 g | 0.33% | BYK USA, Inc./Defoamer |
| Carbowet 109 | 1.9 g | 0.51% | Air Products and Chemicals, Inc./Surfactant |
| Kronos 2300 | 68.2 g | 18.16% | Kronos, Inc./White Pigment |
| Jeffamine D400 | 55.8 g | 14.86% | Huntsman Corp./Polar Hardener |
| Aurosperse W-1025 | 2 g | 0.53% | BASF/Yellow Pigment |
| Formblak Jet N3 | 20.25 g | 0.07% | Color Mate, Inc./Black Pigment |
| | 375.53 g | 100% | |

Parts A and B were mixed together and used to coat the fireproofing material from Example 1. The mixture was applied by brush to yield a uniform coating with a dry film thickness of 2 or 4 mils.

Example 5—Water-Based Latex Topcoat

A water-based latex topcoat was prepared. In a steel cup, the following components were mixed:

| Component | Amount | Wt % | Supplier/Description |
|---|---|---|---|
| Water | 13.56 g | 6.20% | Carrier |
| Celvolit 2416 | 40 g | 18.27% | Celanese/Water-based resin |
| Dysperbyk 190 | 1.8 g | 0.82% | BYK USA, Inc./Dispersant |
| BYK-034 | 0.2 g | 0.09% | BYK USA, Inc./Defoamer |
| Carbowet 109 | 0.6 g | 0.27% | Air Products and Chemicals, Inc./Surfactant |
| Kronos 2300 | 18 g | 8.22% | Kronos, Inc./White Pigment |
| Allen G | 36 g | 16.45% | IMERYS/Clay filler |
| Zinc Oxide | 6.6 g | 3.02% | U.S. Zinc, Reaction rate modifier |
| Aurosperse W-1025 | 1 g | 0.53% | BASF/Yellow Pigment |
| Formblak Jet N32 | 0.12 g | 0.07% | Color Mate, Inc./Black Pigment |
| Celvolit 2416 | 76 g | 34.56% | Celanese/Water-based resin |
| Solusolv 2075 | 6 g | 2.73% | Solutia, Inc./Coalescent |
| Water | 20 g | 9.10% | Carrier |
| | 219.88 g | 100% | |

The latex topcoat was used to coat the fireproofing material from Example 1.

Example 6—Drying Study

The coated plates from Examples 2-5 were tested in a drying study. The respective coatings were applied in various dry film thicknesses (dft) and at various times (time) after the fireproofing was applied. The uniformity of the coatings were determined by visual inspection. The dft was calculated for the 12"×12" area and did not account for any surface roughness. The 7-day water loss was measured. The water loss was determined relative the fireproofing without any sealant (none). Each sample was dried at about 73-75° F. and about 30-40% relative humidity with minimal air movement. The drying study results are presented below:

| Sealant | dft (mils) | Time (hrs) | 7-day wt loss | Coating Uniformity |
|---|---|---|---|---|
| None | None | n/a | 100% | |
| Non-polar water-based epoxy sealant (Ex 2) | 2.0 | 4 | 79% | Uniform |
| Carboguard ® 1340 | 2.0 | 4 | NA | Non-Uniform |
| Non-polar water-based epoxy sealant (Ex 2) | 2.0 | 24 | 72% | Uniform |
| Non-polar water-based epoxy sealant (Ex 2) | 4.0 | 24 | 65% | Uniform |
| Carboguard ® 1340 | 2.0 | 24 | 96% | Non-Uniform |
| Carboguard ® 1340 | 4.0 | 24 | 78% | Non-Uniform |
| Polar water-based epoxy sealant (Ex 4) | 2.0 | 24 | 92% | Uniform |
| Polar water-based epoxy sealant (Ex 4) | 4.0 | 24 | 65% | Uniform |
| Non-polar water-based epoxy sealant (Ex 2) | 2.0 | 72 | 85% | Uniform |
| Non-polar water-based epoxy sealant (Ex 2) | 4.0 | 72 | 83% | Uniform |
| Carboguard ® 1340 | 2.0 | 72 | 92% | Non-Uniform |
| Carboguard ® 1340 | 4.0 | 72 | 86% | Non-Uniform |
| Polar water-based epoxy sealant (Ex 4) | 2.0 | 72 | 93% | Non-Uniform |
| Polar water-based epoxy sealant (Ex 4) | 4.0 | 72 | 88% | Uniform |
| Polar water-based epoxy sealant (Ex 4), then | 2.0 | 72 | | Non-Uniform |
| 4 hours later water-based latex topcoat (Ex 5) | 2.0 | 76 | 86% | Non-Uniform |

The target drying rate was between about 70-90% of the non-sealed control. A drying rate between about 70-90% provide a good balance between reducing the early drying rate (to improve curing) without excessive times for complete drying. This study shows that the prior art (e.g., Carboguard® 1340) did not form a uniform coating when applied within 72 hours of SFRM application and requires 4 mils to provide the desired reduction in drying rate, compared to only 2 mils required for non-polar, water-based epoxy sealants. Similarly, non-polar, water-based epoxy sealants show better performance vs. polar, water-based epoxy sealants. However, polar, water-based epoxy sealants are useful as a primer over which a topcoat can be applied (i.e., last two lines of Table). For example, a polar, water-based epoxy sealant was used at 2 mils because of its small reduction in drying rates, such that the topcoat can also be applied without significantly slowing down the drying. The same can be achieved with 1 mil of the non-polar, water-based epoxy sealant followed by 2 mils of the latex topcoat.

Example 7—Protection Against Water Ingress Study

The coated plates from Examples 2-5 were tested in a water study. The respective coatings were applied in various dry film thicknesses (dft) and at various times (time) after the fireproofing was applied. The dft was calculated for the 12"×12" area and did not account for any surface roughness. The percent water ingress was measured. Water ingress was determined by spraying water for 3 minutes continuously from a commercial paint sprayer while the dried plate were maintained in a vertical position, so excess water could run off the surface. Water gain was determined relative to the fireproofing without any sealant (none). The ambient conditions during the water spraying was about 73-75° F. and about 30-40% relative humidity with minimal air movement. The water study results are presented below:

| Sealant | dft (mils) | Time (hrs) | water ingress |
|---|---|---|---|
| None | None | n/a | 100% |
| Non-polar water-based epoxy sealant (Ex 2) | 2.0 | 4 | 28% |
| Non-polar water-based epoxy sealant (Ex 2) | 2.0 | 24 | 13% |
| Non-polar water-based epoxy sealant (Ex 2) | 4.0 | 24 | 9% |
| Carboguard ® 1340 | 2.0 | 24 | 27% |
| Carboguard ® 1340 | 4.0 | 24 | 21% |
| Polar water-based epoxy sealant (Ex 4) | 2.0 | 24 | 42% |
| Polar water-based epoxy sealant (Ex 4) | 4.0 | 24 | 19% |
| Non-polar water-based epoxy sealant (Ex 2) | 2.0 | 72 | 11% |

-continued

| Sealant | dft (mils) | Time (hrs) | water ingress |
|---|---|---|---|
| Non-polar water-based epoxy sealant (Ex 2) | 4.0 | 72 | 7% |
| Carboguard ® 1340 | 2.0 | 72 | 11% |
| Carboguard ® 1340 | 4.0 | 72 | 6% |
| Polar water-based epoxy sealant (Ex 4) | 2.0 | 72 | 32% |
| Polar water-based epoxy sealant (Ex 4) | 4.0 | 72 | 19% |
| Polar water-based epoxy sealant (Ex 4), then | 2.0 | 72 | |
| 4 hours later water-based latex topcoat (Ex 5) | 2.0 | 76 | n/a |

The target water ingress value was less than 20%, and ideally less than 10%. In some embodiments, the present disclosure relates to a coating composition wherein the amount of water penetration during a 3-minute water spray is reduced by more than 80%, or more than 90%, of that in the absence of the coating, for example, the coating generated by the water-based epoxy composition. This study shows that when a coating is applied 24-hours after the fireproofing is sprayed, a non-polar, water-based epoxy sealant reduces water ingress by more than 80% at 2 or 4 mils. The prior art (e.g., Carboguard® 1340) does not.

While this disclosure has been particularly shown and described with reference to example embodiments thereof, it will be understood by those skilled in the art that various changes in form and details may be made therein without departing from the scope of the invention encompassed by the appended claims.

We claim:

1. A method of coating comprising
   (i) applying a coating of fireproofing material directly to a substrate, wherein the coating of fireproofing material has a thickness of 1 inch or more, wherein the fireproofing material is a plaster-based or cement-based fireproofing comprising an inorganic binder and aggregate, and wherein the coating of fireproofing material has a water content of at least about 20 wt %; and
   (ii) applying a uniform coating of a coating composition directly to the coating of fireproofing material, wherein the coating of a coating composition has a thickness between 1 and 6 mils, and wherein the coating composition is a water-based epoxy composition comprising an epoxy resin, and amine hardener and water.

2. The method of claim 1, wherein the uniform coating of a coating composition is directly applied to the coating of fireproofing material within 7 days after the fireproofing material is directly applied to the substrate.

3. The method of claim 2, wherein the uniform coating of a coating composition is directly applied to the coating of fireproofing material within 5 days after the fireproofing material is directly applied to the substrate.

4. The method of claim 3, wherein the uniform coating of a coating composition is directly applied to the coating of fireproofing material within 3 days after the fireproofing material is directly applied to the substrate.

5. The method of claim 4, wherein the uniform coating of a coating composition is directly applied to the coating of fireproofing material within 48 hours after the fireproofing material is directly applied to the substrate.

6. The method of claim 5, wherein the uniform coating of a coating composition is directly applied to the coating of fireproofing material within 24 hours after the fireproofing material is directly applied to the substrate.

7. The method of claim 6, wherein the uniform coating of a coating composition is directly applied to the coating of fireproofing material within 8 hours after the fireproofing material is directly applied to the substrate.

8. The method of claim 7, wherein the uniform coating of a coating composition is directly applied to the coating of fireproofing material within 4 hours after the fireproofing material is directly applied to the substrate.

9. The method of claim 8, wherein the uniform coating of a coating composition is directly applied to the coating of fireproofing material within 1 hour after the fireproofing material is directly applied to the substrate.

10. The method of claim 1, wherein the coating of the coating composition has a thickness between 2 and 4 mils.

11. The method of claim 1, wherein the article produced by said method exhibits a water loss of between about 70%-90% when dried at about 73-75° F. and 30%-40% relative humidity for 7 days.

12. The method of claim 1, wherein the article produced by said method exhibits water ingress of less than 20% when sprayed with water for 3 minutes.

13. An article produced by the method of claim 1.

14. The article of claim 13, which exhibits a water loss of between about 70%-90% when dried at about 73-75° F. and 30%-40% relative humidity for 7 days.

15. The article of claim 13, which exhibits water ingress of less than 20% when sprayed with water for 3 minutes.

16. The method of claim 1, wherein the epoxy resin is a bisphenol A based epoxy resin and the amine hardener is an aliphatic polyamine or amido-amine.

17. An article produced by the method of claim 16.

* * * * *